(12) United States Patent
Greenwood

(10) Patent No.: US 7,409,865 B2
(45) Date of Patent: Aug. 12, 2008

(54) DIAPHRAGM STRUCTURE

(75) Inventor: John Christopher Greenwood, Leicestershire (GB)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/617,832

(22) Filed: Dec. 29, 2006

(65) Prior Publication Data
US 2007/0113662 A1    May 24, 2007

Related U.S. Application Data

(63) Continuation-in-part of application No. 11/241,049, filed on Sep. 30, 2005.

(51) Int. Cl.
*G01L 7/08* (2006.01)
(52) U.S. Cl. ........................................................ 73/715
(58) Field of Classification Search ................ 73/718; 361/283.2, 278, 290
See application file for complete search history.

(56) References Cited

U.S. PATENT DOCUMENTS
4,089,036 A * 5/1978 Geronime ................ 361/283.2

FOREIGN PATENT DOCUMENTS
EP    1273896 A2    1/2003

OTHER PUBLICATIONS
U.S. Appl. No. 11/241,049, filed Sep. 30, 2005, Kanakasabapathi, Subramanian.

* cited by examiner

*Primary Examiner*—Jewel V Thompson
(74) *Attorney, Agent, or Firm*—GE Global Patent Operation

(57) ABSTRACT

A diaphragm structure with a first substrate including a first surface with an annular groove therein and a second opposing surface with an annular groove on each side of annular groove in the first surface defining a first diaphragm. A second substrate also includes a first surface with an annular groove therein and a second opposing surface with an annular groove on each side of the annular groove in the first surface defining a second diaphragm. A diaphragm overload stop is located behind the first and second diaphragms.

10 Claims, 4 Drawing Sheets

DIAPHRAGM STRUCTURE

CROSS-REFERENCE TO RELATED APPLICATIONS

This application is a continuation-in-part application of U.S. patent application Ser No. 11/241049 filed Sep. 30, 2005, the entirety of which is hereby incorporated in this application.

FIELD OF THE INVENTION

This subject invention relates to pressure sensors.

BACKGROUND OF THE INVENTION

One version of a differential pressure sensor includes spaced diaphragms and a resonator structure in a cavity between the diaphragms. The diaphragms move together in response to a differential pressure causing the mass structure of the resonator to move resulting in a strain which can be measured and correlated with a force measurement such as pressure.

Traditional differential pressure sensors are designed to determine the differential pressure between the two sides of the sensor. By way of example, traditional differential pressure sensors detect the differential pressure between two regions of interest by evaluating the net effect of the pressure forces of the two regions on a component or components of the sensor. When employed in harsh industrial environments, traditional pressure sensors often require a more robust construction. For example, if a differential pressure sensor is exposed to relatively high-pressure and/or high-temperature environments, the exposed components of the pressure sensor benefit from a construction robust enough to accommodate these conditions.

The features and attributes that facilitate operation in such high pressure (i.e., harsh) environments, however, can negatively impact the resolution of the sensor. Some traditional differential pressure sensors that are robust enough to withstand high-pressure environments, for example, cannot detect the pressure differential between the two regions of interest in orders of magnitude less than the pressure difference in the environment. For example, a resonating differential pressure sensor robust enough to withstand pressures of 5000 pounds per square inch (psi), and beyond, generally does not have sufficient resolutional capabilities to detect a pressure differential of +/−10 psi, for instance. This is because traditional resonating pressure sensors contain a vacuum within the closed enclosure between the diaphragms of the pressure sensor and therefore, with high pressures acting on the each of the diaphragms, the diaphragms may tend to bulge inside.

Thus, there is a need for a pressure sensing system and method that can provide differential pressure sensing capabilities with high resolution, while withstanding high line-pressures.

In another example, high line pressure differential pressure sensors are used to measure a small differences between two high pressures. A typical application is to measure flow in an oil pipeline. A calibrated obstruction is placed in the pipeline and the pressure difference between the two sides of the obstruction is a function of the flow rate. Typically the differential pressure is less than 10 psi while the pressure in the pipeline is 3000 psi.

In certain fault conditions, the full line pressure is applied to one side of the diaphragm with ambient pressure applied to the other. Without overpressure protection, the sensor would be destroyed. Many sensors on the market have some sort of overpressure protection mechanism built in.

Some pressure sensors of this type use a silicon pressure sensing element which can be provided with stops. A known example has a boss on the diaphragm which is a monolithic part of the silicon. There is a small gap between the boss and a substrate.

This design, however, may not provide a sufficient degree of protection for a high line pressure sensing application because the flexible region of the diaphragm is unsupported. This region has to be sufficiently flexible to sense the differential pressure which necessarily means that it is too flexible to stand the line pressure. Also, the boss stop provides protection in only one direction.

The deflection of a silicon pressure diaphragm is typically sensed by diffused strain gauges. The amount of strain needed to obtain a satisfactory signal takes the strain in the material as far towards its breaking strain consistent with an adequate margin of safety.

A stop for a flat diaphragm would need to act over the whole area and conform to the shape of the surface of the diaphragm. The movement of the diaphragm is very small. Therefore, it would be difficult to fabricate a conformal stop with sufficient accuracy.

When a diaphragm is limited by a conformal stop at high pressure, the forces on the surface are high and there is a risk that some damage of deformation may result. Such damage on the flexible part of the diaphragm carries the risk that the elastic behavior is changed and, as a result, the calibration of the instrument is altered. This is highly undesirable. It is a normal practice to replace instruments that have been subjected to line pressure in order to guarantee a know calibration.

BRIEF SUMMARY OF THE INVENTION

The subject invention features a pressure sensor with a more robust construction. The pressure sensor is operable in high pressure environments and has better resolution. The inventive pressure sensor is also stable.

The subject invention results from the realization that a more robust pressure sensor operable in high pressure environments with better resolution is effected by the combination of a special diaphragm structure together with an overload stop.

In one embodiment, this subject invention features a diaphragm structure comprising a first substrate including a first surface with an annular groove therein and a second opposing surface with an annular groove on each side of annular groove in the first surface defining a first diaphragm. A second substrate also includes a first surface with an annular groove therein and a second opposing surface with an annular groove on each side of the annular groove in the first surface defining a second diaphragm. There is a diaphragm overload stop behind the first and second diaphragms.

The first substrate first surface may include channels across the first diaphragm and the second substrate first surface may also include channels across the second diaphragm. Typically, a resonator structure is suspended in the channels. Preferably, there are means for preventing sticking of the diaphragms to their respective overload stops. In one example, there is a rough surface on at least one of the diaphragms and the overload stops. In another example, there is a coating on at least one of the diaphragms and the overload stops.

The subject invention also features a diaphragm structure comprising a substrate including a first surface with an annular groove therein and a second opposing surface with an annular groove on each side of the annular groove in the first surface defining a first diaphragm and a diaphragm overload stop structure spaced from the diaphragm.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
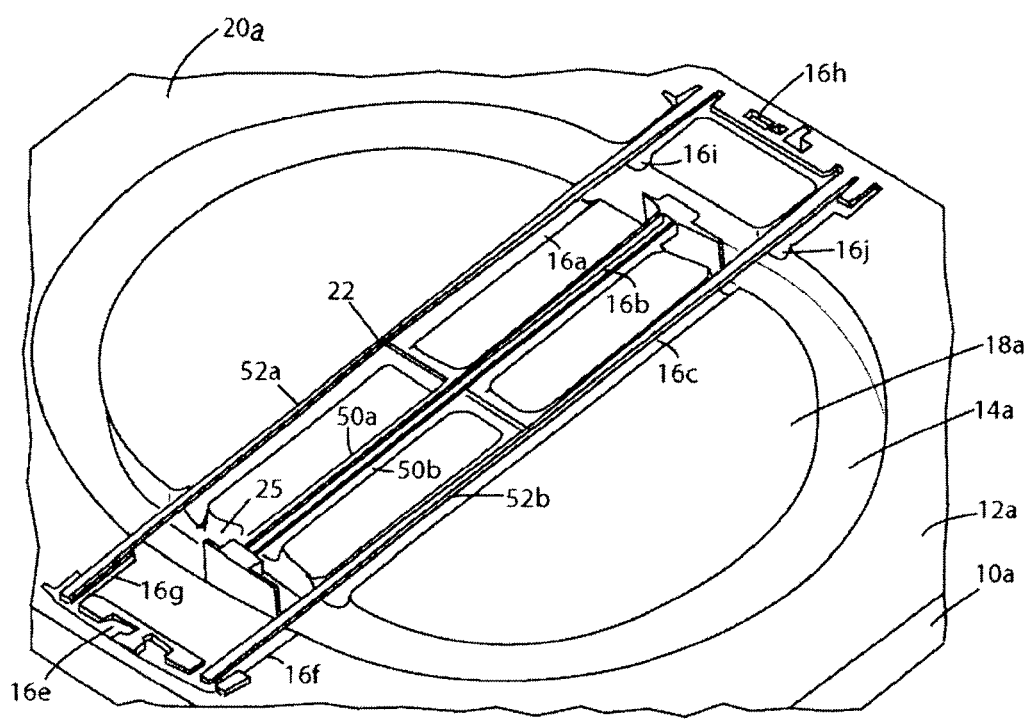
FIG. 1 is a schematic three-dimensional top view showing the primary portions of one half of an example of a pressure transducer in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows an example of a portion of a pressure transducer in accordance with the subject invention. Substrate 10a (typically silicon) includes surface 12a with annular groove 14a therein defining diaphragm 18a. Typically, channels 16a-16c cross diaphragm 18a. Channel 16d is shown intercepting channels 16a-16c and also shown are channels 16e-16j in frame portion 20a. These channels house resonator structure 22 suspended in the channels as shown. One or more anchor structures as shown at 25 may be provided.

Figure 2:
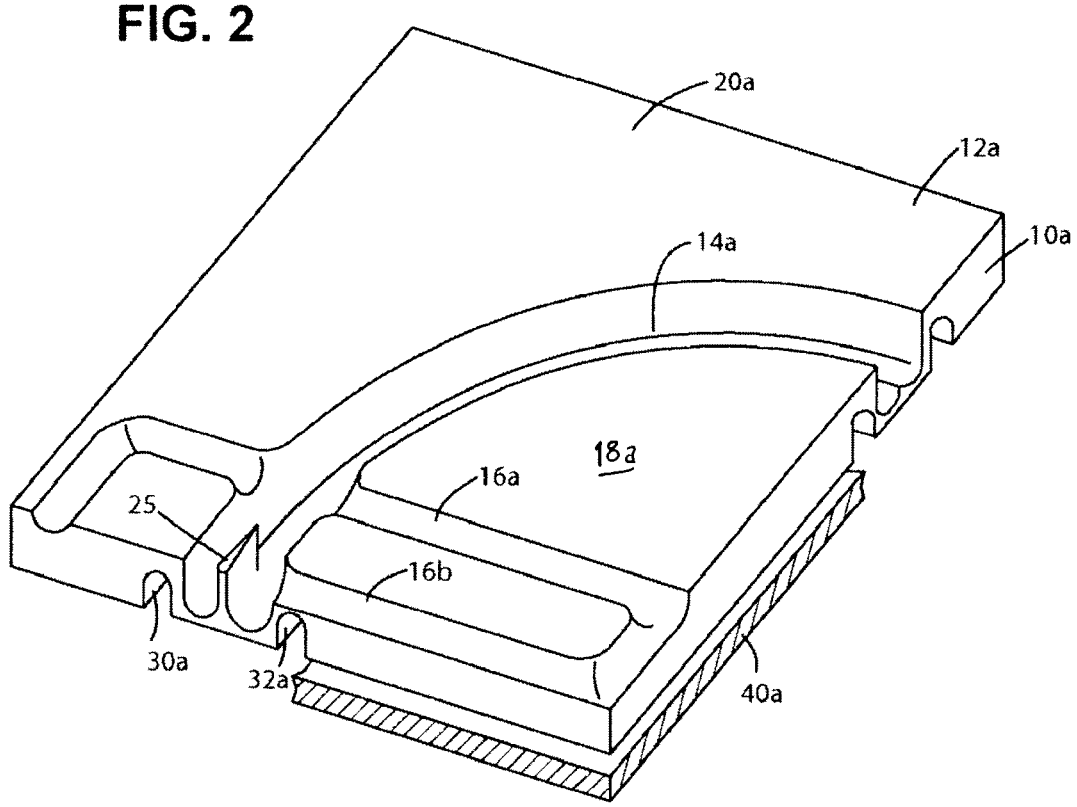
FIG. 2 is a schematic three-dimensional partial cross-sectional view showing a portion of the pressure transducer shown in FIG. 1.

FIG. 2 shows a portion of substrate 10a without the resonator structure. In FIG. 2, it can be seen that the surface opposite surface 12a in the substrate includes annular grooves 30a and 32a, one on each side of annular groove 14a in surface 12a. Diaphragm overload stop 40a is also shown disposed adjacent diaphragm 18a as shown. There is a small gap between diaphragm 18a and stop 40a.

Figure 3:
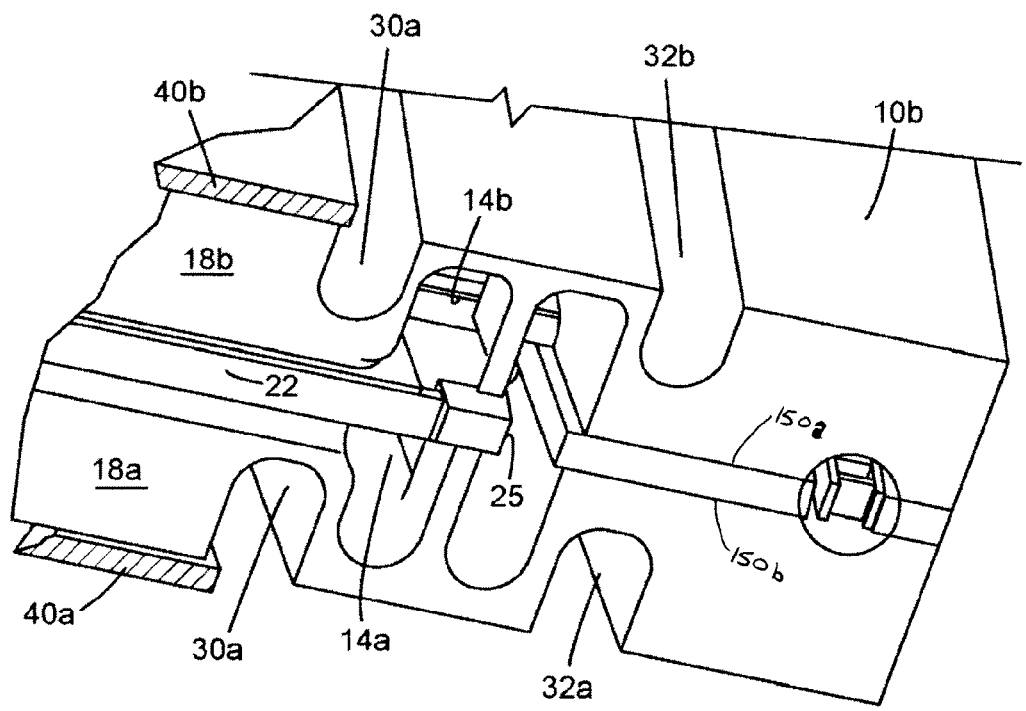
FIG. 3 is a schematic three-dimensional partial cross-sectional view of a pressure transducer in accordance with subject invention now showing the other half or second wafer secured to the first wafer shown in FIG. 1.

Two such structures joined together are shown in FIG. 3. Substrate 10b also includes annular groove 14b and opposite side annular grooves 30b and 32b define diaphragm 18b. Resonator structure 22 resides between diaphragm 18a and 18b and may be insulated therefrom via layers of oxide as shown at 150a and 150b. Diaphragm overload stop structures 40a and 40b are also shown in FIG. 3.

Such a structure may made by bonding two silicon wafers together which are etched so that a sealed cavity is formed between them as discussed above. This cavity is then evacuated and contains a sensing resonator. The resonator structure may vary in design from that shown in FIG. 1. The preferred geometry is designed so that the evacuated cavity can withstand a full line pressure, in one particular example, 300 bar on both sides. Also, the resonator is coupled to the diaphragm so that a reasonable change of frequency, in one example 20%, results from a differential pressure of 1 bar. The diaphragms are able to withstand the full line pressure on one side with the provision of the stops at a spacing such as 10 microns from the diaphragm. The flexibility to measure differential pressure results from the system of grooves 14, 30, and 32 with an overall racetrack shape, i.e. semicircular ends with a short straight section in between. The resonator can be a variation of the lever of the design shown in European Patent No. 1 273 896, incorporated herein by this reference. One resonator structure 22 typically includes two central tynes 50a and 50b, FIG. 1 which form a basic double-ended-tuning-fork which is put into tension by the applied differential. The outer tynes 52a and 52b would have a comb drive, not shown, along most of their length. At the ends of the outer tynes there may be sensing levers and a link between the two halves that provides the coupling necessary to differentiate between the in-phase and out-of-phase modes. The remainder of the resonator layers are not shown in the drawings.

Figure 4:
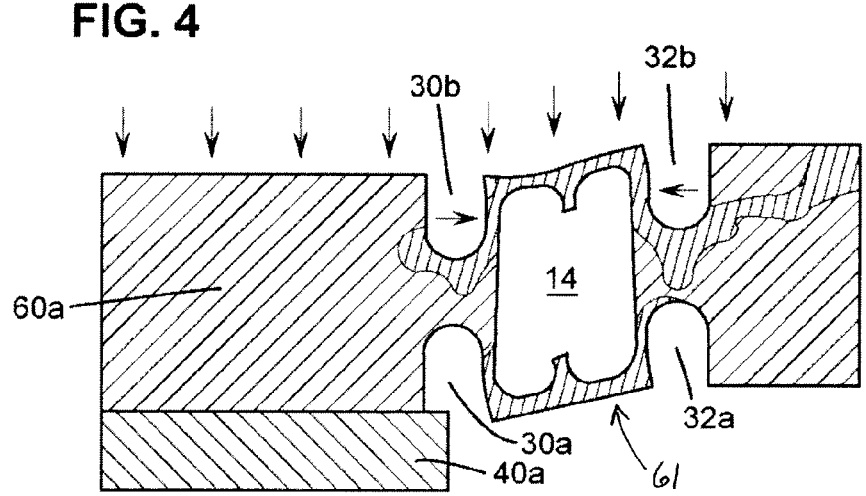
FIG. 4 is a highly schematic three-dimensional cross-sectional view of a portion of the pressure transducer shown in FIG. 3.

FIG. 4 shows how the "tongue" portion 61 is twisted to give a sideways displacement to the end of a resonator tyne. FIG. 4 shows the deformation caused by the static pressure applied to one side only. Most of the stress is compressive for which silicon is very strong. The maximum tensile stress is about 3000 microstrain. The dimensions of the grooves 14, 30, and 32 were optimized using a model. In one example, they were 200 microns wide and the wall thickness was 45 microns. The grooves can be formed by a deep reactive ion etching a slot 20 microns wide and then opening the slot by an isotropic etching process. An acid (HF—$HNO_3$-Acetic) mixture could be used but the more precise gaseous $XeF_2$ etching technology is preferred.

The design of the diaphragm of this invention has the feature that the flexible part 61 is intrinsically strong enough to withstand the full line pressure because it has to support the contained vacuum. This means that stop 40a need act only on the non-flexing central area 60a. Other sensing means can be used with a diaphragm of this design besides the resonator structure discussed above.

One resonator is essentially a stretched string of silicon. This structure could be used instead as a strain gauge by passing a current along it and measuring the change of resistance.

Figure 5:
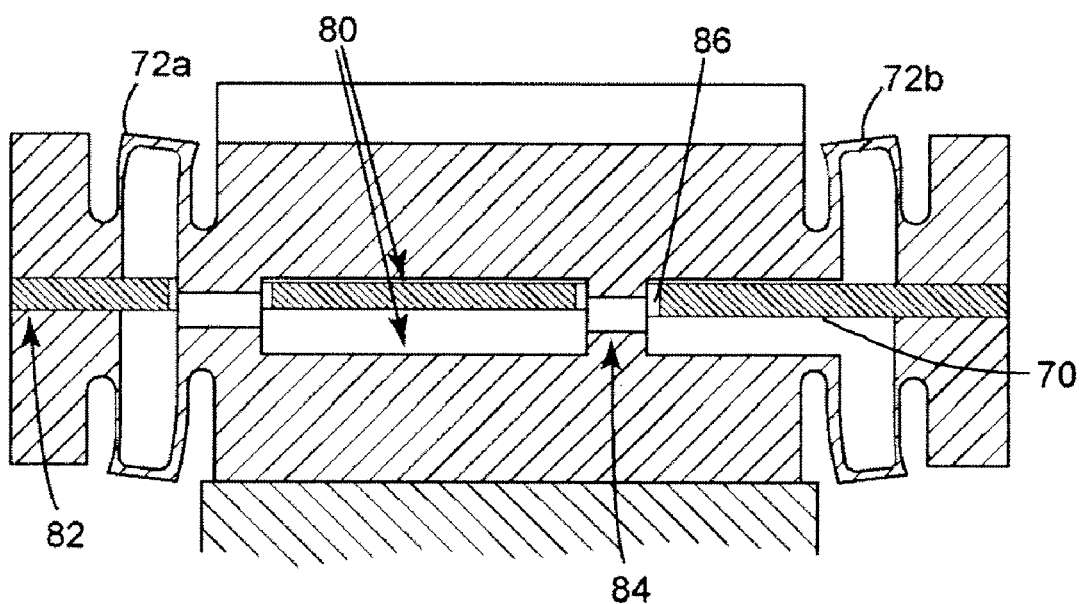
FIG. 5 is a highly schematic three-dimensional partial cross-sectional view showing another embodiment of a pressure transducer in accordance with the subject invention.

Also, as shown in FIG. 5, capacitive sensing could be achieved by replacing the resonator with flat plate 70 suspended around the edges so that it stays in the same position when the diaphragm moves. It extends through a cavity in the central solid region of the diaphragm. The gap between the surface of the plate and the bottom of the cavity is small and changes with diaphragm deflection thus changing the capacitance. The cavity may have an array of props between the two halves of the diaphragm extending through apertures in the plate to support the line pressure.

Note that the flexible regions 72a and 72b are vertical walls which are in overall compression. Silicon, like most brittle materials, is considerably stronger in compression. This geometry enables the designer to achieve the sufficient strength combined with the sufficient compliance. Note that the wall thickness could be defined by a boron etch stop. Only one overload stop is shown at 74 in FIG. 5. Also shown is variable capacitor gaps 80, oxide insulation layer 82, support pillar 84, and aperture 86 in fixed capacitor plate 70.

When an over pressure event occurs, the surface of a diaphragm may be pressed hard against the stop and may stick to the stop. Normally, silicon surfaces are optically flat and prone to forming bonds that are typified by bringing optically flat surfaces together. There may be weak chemical bonds forming in which case the diaphragm could stay stuck to the stop or the flow of the pressure medium into the very small gap is slowed by the viscosity effects.

Thus, it preferred in accordance with the subject invention that either the surface of the stops 40, FIG. 3 and/or the surface of diaphragms 18 be made rough. There can be a system of grooves in either the stops or the diaphragms, for example, to conduct the pressure medium into the gap. In still another example, the diaphragms and/or the stops could be coated with layers that are not prone to sticking. Suitable coatings include, silicon nitride, titanium oxide, and diamond-like carbon which are known to be particularly good for chemical inertness and hardness.

The result in any embodiment is a more robust pressure sensor operable in high pressure environments with better resolution and enhanced stability.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A diaphragm structure comprising:
    a first substrate including a first surface with an annular groove therein and a second opposing surface with an annular groove on each side of annular groove in the first surface defining a first diaphragm;
    a second substrate also including a first surface with an annular groove therein and a second opposing surface with an annular groove on each side of the annular groove in the first surface defining a second diaphragm; and
    a diaphragm overload stop behind the first and second diaphragms.

2. The diaphragm structure of claim 1 in which the first substrate first surface includes channels across the first diaphragm and the second substrate first surface includes channels across the second diaphragm.

3. The diaphragm structure of claim 2 further including a resonator suspended in the channels.

4. The diaphragm structure of claim 1 further including means for preventing sticking of the diaphragms to the respective overload stops.

5. The diaphragm structure of claim 4 in which said means includes a rough surface on at least one of the diaphragms and the overload stops.

6. The diaphragm structure of claim 4 in which said means includes a coating on at least one of the diaphragms and the overload stops.

7. A diaphragm structure comprising:
    a substrate including a first surface with an annular groove therein and a second opposing surface with an annular groove on each side of the annular groove in the first surface defining a first diaphragm; and
    a diaphragm overload stop structure spaced from the diaphragm.

8. The diaphragm structure of claim 7 further including means for preventing sticking of the diaphragm to the respective overload stop.

9. The diaphragm structure of claim 8 in which said means includes a rough surface on at least one of the diaphragm and the overload stop.

10. The diaphragm structure of claim 8 in which said means includes a coating on at least one of the diaphragm and the overload stop.

* * * * *